3,297,822
NAVIGATION SYSTEM WITH OPTICAL MEANS FOR PROVIDING A SUPERIMPOSED COMPOSITE IMAGE OF A CATHODE RAY TUBE DISPLAY AND A FURTHER MAP DISPLAY
James Muir Braid, Edinburgh, Scotland, assignor to Ferranti, Limited, Hollinwood, Lancashire, England, a company of Great Britain and Northern Ireland
Filed June 20, 1963, Ser. No. 289,311
Claims priority, application Great Britain, June 29, 1962, 24,966/62
7 Claims. (Cl. 178—7.85)

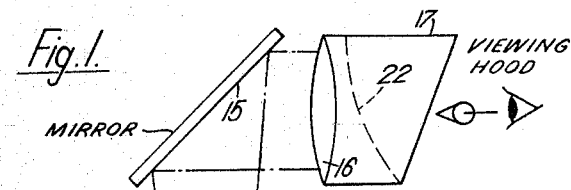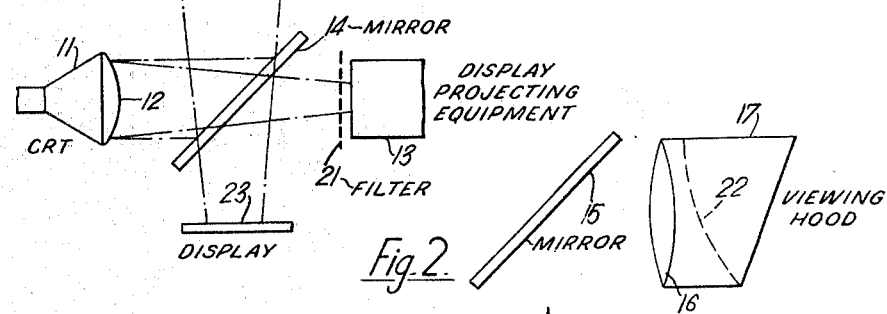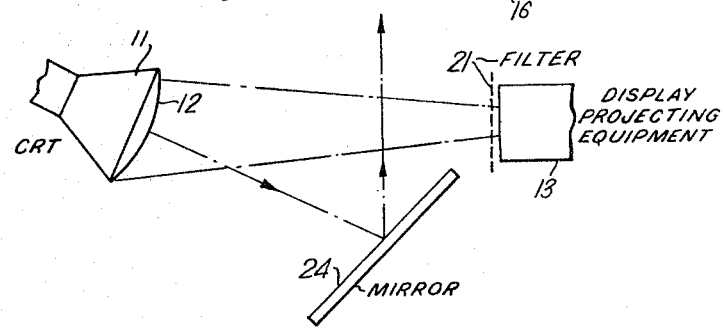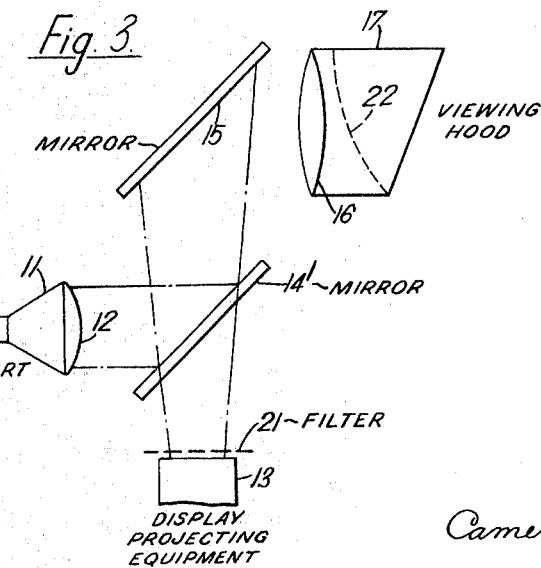

This invention relates to navigation systems of the kind including a cathode-ray (CR) tube carried by the craft and arranged to display a radar map of the terrain being traversed.

It is sometimes desirable to supplement the information given by such a display by a similar map display derived from an independent source, so that the two displays complement and correct one another, and an object of the invention is to provide a navigation system in which the comparison of two such displays is facilitated.

In accordance with the present invention, a navigation system includes a cathode-ray tube arranged to provide on its screen a radar map display of the terrain being traversed, means for providing a further map display of said terrain, and an optical system for providing an observer with an image at or near infinity of the two displays superimposed in register with one another.

In the accompanying drawing,

FIGURE 1 shows a simplified view in elevation of one embodiment of the invention, FIGURE 2 shows a part of the arrangement of FIGURE 1 modified in accordance with another embodiment, and FIGURE 3 shows a further embodiment.

In carrying out the invention in accordance with one form by way of example, an airborne navigation system includes a CR tube 11—see FIGURE 1 of the accompanying drawings—arranged to provide on its screen 12 in known manner a radar map of the PPI kind of the terrain being traversed. The tube includes the customary electronic markers to define a desired target location.

Also included in the system is apparatus, shown generally at 13, for providing a display of the so-called moving-map kind in which a preformed map, preferably coloured, on paper or photographic film is maintained in motion by signals, for example from associated navigational equipment, both in translation and rotation in accordance with the motion of the craft so that the part of the map seen by the observer is correctly orientated and corresponds to the terrain being traversed. The signals which control this map are independent of those which control the PPI display.

Components 11 and 13 are disposed with their displays facing one another, and optical arrangements (omitted from the drawing for clarity) including a projector lens are made for projecting the display of the preformed map onto the screen 12 of the CR tube. By adjustment of the controls usually provided with such components, the image on screen 12 of the preformed map may be made to register accurately with the radar map formed on the screen.

To project this composite display into the field of view of the observer, the optical system also includes a semi-transparent mirror 14 disposed at 45° across the optical path by which the image of the preformed map is projected onto screen 12. The image of the composite display formed on screen 12 is reflected by the mirror by way of a fully reflective mirror 15 to a collimating lens 16 placed so that screen 12 lies in its focal plane. The collimated image formed by the lens is projected towards the observer. A viewing hood 17 with matt interior surfaces is provided to shield lens 16 from extraneous light. Mirror 15 is not required where the arrangement is such that the optical path from mirror 14 is conveniently in line with the eye of the observer.

In operation, components 11 and 13 are adjusted so that their respective displays combine in register with one another on screen 12. The composite image is reflected by mirror 14 and reaches the observer by way of mirror 15 and lens 16, the observer seeing the image at infinity.

Where the display of the preformed map is considerably brighter than the PPI display, mirror 14 may be made correspondingly more reflective than transparent so that the displays as superimposed are of approximately equal light intensity, fine adjustment being obtained by means of the respective brightness controls. Such an arrangement allows a more efficient reflection of the PPI display. Hence the expression "semi-transparent mirror" should be understood as including not only mirrors which are partially transparent to any desired degree—for example, a mirror found convenient in practice is 90% reflective and 10% transmissive—but also mirrors of the dichoric type which selectively reflect or transmit light of different wavelengths.

Once the displays have thus been adjusted into coincidence, the respective signal sources maintain them so, giving the observer the benefit of continuously having the two maps in the same field of view. Several important advantages result from the two maps being thus superimposed. To begin with, the two maps make good each other's deficiencies, the gaps in the radar map due to poor reflectivity or shadowing of ground objects and terrain being filled by the preformed map, which thus makes the radar map easier to interpret. Conversely, the radar map may indicate objects, such as target sites, too recent to be included on the preformed map, whilst the electronic markers of the PPI tube allow of a more accurate fix being obtained. It will readily be appreciated that this superimposition of the two maps allows such comparisons and coordinations to be made very much more quickly and easily than if the displays were separate.

Using the face of the CR tube as the screen for the optical image of the preformed map allows the moving-map equipment 13 to be brought closer to the rest of the apparatus than if the two images were combined only in the observer's field of view. An appreciable reduction in overall bulk is thus obtained; this saving is of especial benefit where the apparatus is airborne, as in the present case.

The fact that the composite image is at infinity to the observer gives the advantage of imposing less strain on his eyes; it moreover prevents relative movement between his eyes and the composite image due to vibration or bouncing movements and so allows fine details of the image to be studied closely without the blurring which vibration and abrupt movement would otherwise cause.

Enchanced contrast may be obtained by the use of an optical filter of colour appropriate to that of the screen phosphor of the CR tube. This may conveniently be effected by locating a filter of complementary colour to the screen phosphor across the optical path of projection of the preformed map display, as indicated at 21 on the drawing. Good contrast is further assisted by the lens system, which reduces the incidence of ambient light on the face of screen 12.

To prevent disturbance caused by reflections from the outer surface of lens 16, a polarising filter may be located at 22 between lens 16 and the observer; the filter may be curved as indicated to ensure that reflections from its front surface towards the observer are only of the matt interior of the hood, which may be rotatable with the filter.

Lens 16 may be arranged to magnify the image of the superimposed displays, thereby allowing a reduction in the overall bulk of the apparatus necessary to provide a composite image of the required size.

The front surface of the glass face of the screen 12 may be bloomed to prevent any tendency for a confusing double image to be reflected from it.

The axis of the optical path from the preformed map display to screen 12 may be slightly inclined to the screen to prevent a reflection from the glass face of the brightly illuminated aperture of the projection lens in equipment 13. By giving this lens a wide angle and causing only a boundary area of the field to reach screen 12, this result may be effected whilst maintaining the axis of the path normal to the screen.

Where it is desired to compare the combined display with a third item of information, such as a reconnaissance photograph or sketch, this item may be located as at 23, so as to be projected direct through mirror 14 in superimposition with the radar and preformed map displays.

Where more convenient, semi-transparent mirror 14 may be replaced by a fully reflective mirror 24—see FIGURE 2—provided it is located, approximately as shown, so as not to intercept the rays from the preformed map display to screen 12. The other components 15 to 17, 21 and 22 may be the same as before.

As another alternative, see FIGURE 3, a semi-transparent mirror 14$^1$ may be used as in FIGURE 1 but with one of the displays—that of component 13, say—projected direct through the mirror. The degree of transparency of the mirror may again be such as to tend to equalise the light intensities, and the other components of the FIGURE 1 arrangement may again be as before.

The PPI display may alternatively be of the true-motion kind compensated for movement of the craft, provided that the preformed map display is of that kind too.

A navigation system in accordance with the invention is also applicable to ships or land vehicles, the maps being then in the form of charts or ground plans, as the case may be.

The invention is also applicable for locating or identifying a target or other object towards which the craft or vehicle does not necessarily intend to move, and the expression "navigating systems" as used in the specification should be given a broad enough interpretation to include such uses.

What I claim is:
1. A navigation system including a cathode-ray tube arranged to provide on its screen a radar map display of the terrain being traversed, means for providing a further map display of the terrain, and an optical system including means disposed for projecting said further display onto said screen so that the two displays are there superimposed in register with one another to provide a composite display, a lens system for providing an observer with an image at or near infinity of the composite display, and a semi-transparent mirror disposed across the optical path from said further display to said screen so as to reflect the composite display towards said lens system.

2. A system as claimed in claim 1 wherein the optical system includes arrangements for combining with said image of the superimposed displays the image of a third display projected direct through the mirror.

3. A system as claimed in claim 1 wherein the degree of transparency of said mirror is such that the displays as superimposed are of approximately equal light intensity.

4. A navigation system including a cathode-ray tube arranged to provide on its screen a radar map display of the terrain being traversed, means for providing a further map display of the terrain, and an optical system including means disposed for projecting said further display onto said screen so that the two displays are there superimposed in register with one another to produce a composite display, means for providing an observer with an image at or near infinity of the composite display, and an optical filter of colour complementary to that of the phosphor of said screen positioned in the optical path between said further display and said screen.

5. A navigation system including a cathode-ray tube arranged to provide on its screen a radar map display of the terrain being traversed, means for providing a further map display of the terrain, and an optical system including means disposed for projecting said further display onto said screen along an optical path substantially normal to said screen so that the two displays are there superimposed in register with one another to produce a composite display without substantial distortion of said further display, and means for providing an observer having no direct view of said screen with an image at or near infinity of the composite display.

6. A system as claimed in claim 5 wherein the optical system is arranged to magnify the image of the superimposed displays.

7. A system as claimed in claim 5 wherein said further display is of the moving-map kind.

References Cited by the Examiner

UNITED STATES PATENTS

| | | | |
|---|---|---|---|
| 2,526,682 | 10/1950 | Mulberger | 178—7.85 X |
| 2,546,510 | 3/1951 | Jones | 178—7.88 |
| 2,621,555 | 12/1952 | Fleming-Williams et al. | 178—7.88 |
| 2,780,132 | 2/1957 | Dickson | 343—5 |
| 2,819,459 | 1/1958 | Dodd | 178—7.85 |

OTHER REFERENCES

Naidich, "Optically Projecting Data on a Cathode-Ray Tube Face," pages 58–60, Electronics, March 3, 1961, vol. 34.

DAVID G. REDINBAUGH, *Primary Examiner.*

R. L. RICHARDSON, *Assistant Examiner.*